(12) United States Patent
Li

(10) Patent No.: US 8,508,261 B2
(45) Date of Patent: Aug. 13, 2013

(54) CURRENT MODE LINE DRIVER

(75) Inventor: Hsin-Hsien Li, Hsinchu County (TW)

(73) Assignee: Ralink Techonology Corp., Jhubei, Hsinchu County (TW)

( * ) Notice: Subject to any disclaimer, the term of this patent is extended or adjusted under 35 U.S.C. 154(b) by 0 days.

(21) Appl. No.: 13/156,351

(22) Filed: Jun. 9, 2011

(65) Prior Publication Data
US 2012/0256661 A1    Oct. 11, 2012

(30) Foreign Application Priority Data

Apr. 7, 2011    (TW) .............................. 100112084 A

(51) Int. Cl.
*H03B 1/00*    (2006.01)
*H03K 3/00*    (2006.01)

(52) U.S. Cl.
USPC ............................ 327/108; 327/110; 327/111

(58) Field of Classification Search
USPC .......................................... 327/108, 110, 111
See application file for complete search history.

(56) References Cited

U.S. PATENT DOCUMENTS
6,445,241 B2 *    9/2002    Gabara ........................ 327/404

* cited by examiner

*Primary Examiner* — John Poos
(74) *Attorney, Agent, or Firm* — Winston Hsu; Scott Margo

(57) ABSTRACT

The present invention discloses a line driver for a communication system with a variable loading. The line driver includes a positive output terminal, a negative output terminal, a plurality of current cells, for generating a plurality of output currents, and a plurality of switches, for controlling a number of connections between the plurality of current cells and the positive output terminal and the negative output terminal according to impedance of the variable loading, to generate a total output current such that a output voltage swing stays within a specific range.

7 Claims, 5 Drawing Sheets

CURRENT MODE LINE DRIVER

BACKGROUND OF THE INVENTION

1. Field of the Invention

The present invention relates to a current mode line driver, and more particularly, to a current mode line driver adapting to a variable loading.

2. Description of the Prior Art

In general, a current communication system enhances signal intensity via a line driver to increase transmitting quality before sending into a transmission line, wherein the line driver can be a voltage mode line driver or a current mode line driver. Since the power line impedance in a power line communication system (PLC) varies from several ohms to ten thousands of ohms, i.e. having a variable loading, the current power line system often applies the voltage mode line driver which can generate stable output voltage swing.

For example, please refer to FIG. 1A, which is a schematic diagram of a conventional power line system 10. The power line system 10 comprises a digital-analog converter (DAC) 102, a filter 104 and a line driver 106. After the DAC 102 converts a digital signal to an analog signal, the analog signal is filtered by transmission filter 104, and then sent to the line driver 106. The line driver 106 outputs inverse differential signals to a power line via a positive output terminal OUTP and a negative output terminal OUTN, e.g. center 3.5V outputting inverse differential signals with a center of 3.5V and an output voltage swing of 7V when operating between 0V to 7V.

In such a condition, please refer to FIG. 1B and FIG. 1C, which are schematic diagrams of voltage mode line drivers 108 and 110 for realizing the line driver 106 in FIG. 1A, respectively. As shown in FIG. 1B and FIG. 1C, the voltage mode line driver 108 and 110 mainly comprise operational amplifiers (OP) and a feedback circuit. Therefore, the voltage mode line driver 108 and 110 can generate stable output voltage swings on the power line with the variable loading via the formed closed loop structure, thus having better linearity. However, since the frequency range of a power line system increases, i.e. up to 100 MHz analog bandwidth, the OPs of the voltage mode line driver 108 and 110 reach their unit gain bandwidth during high frequency transmission, i.e. the OPs have no gain during high frequency transmission. In such a condition, it needs to increases quiescent currents to maintain feedback stability for avoiding oscillating, thus causing higher power consumption to maintain linearity.

On the other hand, please refer to FIG. 1D, which is a schematic diagram of a current mode line driver 112 for realizing the line driver 106 in FIG. 1A. As shown in FIG. 1D, the current mode line driver 112 is an open loop structure and thus has faster output speed, so as to perform high frequency transmission with a lower quiescent current and thus have lower power consumption. However, since the current mode line driver 112 generates the differential signals by utilizing the analog signal to control a pair of current cells to output current to the power line with the variable loading. Therefore, the output voltage swing of the current mode line driver 112 has severe variations due to loading variations, which may be out of the ideal operating range. Besides, the current mode line driver 112 is an open loop structure, having worse linearity.

Thus, there is a need to provide a line driver adapting to a power line system during high frequency transmission.

SUMMARY OF THE INVENTION

It is therefore an objective of the present invention to provide a current mode line driver adapting to a variable loading.

The present invention discloses a line driver for a communication system with a variable loading. The line driver includes a positive output terminal, a negative output terminal, a plurality of current cells, for generating a plurality of output currents, and a plurality of switches, for controlling a number of connections between the plurality of current cells and the positive output terminal and the negative output terminal according to a impedance of the variable loading, to generate a total output current such that an output voltage swing stays within a specific range.

These and other objectives of the present invention will no doubt become obvious to those of ordinary skill in the art after reading the following detailed description of the preferred embodiment that is illustrated in the various figures and drawings.

DETAILED DESCRIPTION

Figure 2A:
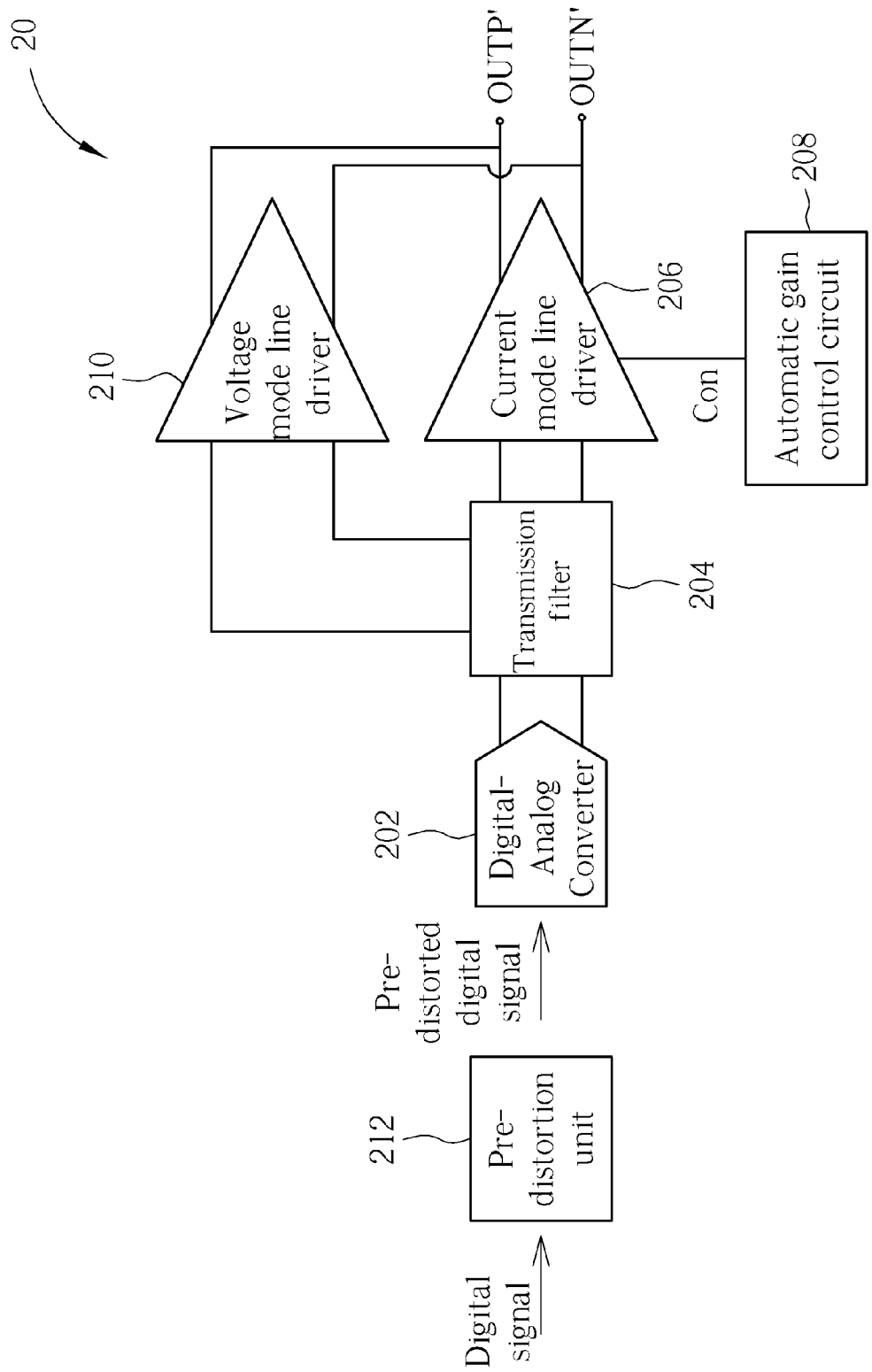
FIG. 2A is a schematic diagram of a power line system according to an embodiment of the present invention.

Please refer to FIG. 2A, which is a schematic diagram of a power line system 20 according to an embodiment of the present invention. The power line system 20 comprises a digital-analog converter (DAC) 202, a transmission filter 204, a current mode line driver 206 and an automatic gain control circuit (AGC) 208. Functions of the DAC 202 and the transmission filter 204 are similar to those of the DAC 102 and the transmission filter 104, and can be derived by referring to above illustrations. The current mode line driver 206 adjusts a maximum of a total output current $IO_s$ according to impedance of a variable loading on a power line, and thus the output voltage swing can stay within a specific range.

Figure 2B:
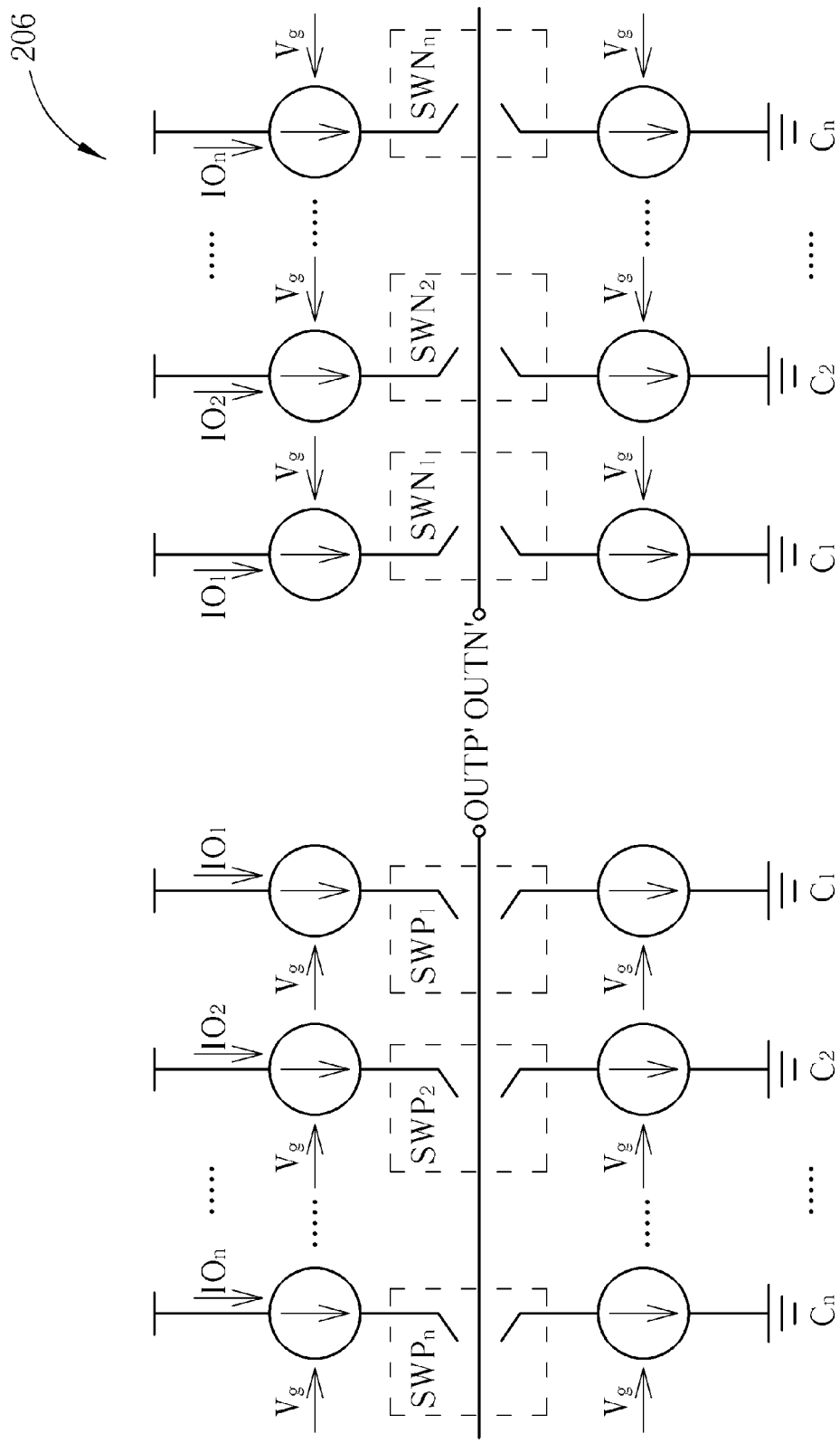
FIG. 2B is a schematic diagram of a current mode line driver in FIG. 2A.

In detail, please refer to FIG. 2B, which is a schematic diagram of the current mode line driver 206 in FIG. 2A. The current mode line driver 206 comprises a positive output terminal OUTP', a negative output terminal OUTN', current cells $C_1$-$C_n$, switches $SWP_1$-$SWP_n$ and switches $SWN_1$-$SWN_n$. As shown in FIG. 2B, the current cells $C_1$-$C_n$ generate output currents $IO_1$-$IO_n$, respectively. The switches $SWP_1$-$SWP_n$ and the switches $SWN_1$-$SWN_n$ are coupled between the current cells $C_1$-$C_n$ and the positive output terminal OUTP' and the negative output terminal OUTN', respectively, wherein each current cell of the current cells $C_1$-$C_n$ include components coupled to the positive output terminal OUTP' and the negative output terminal OUTN'. In such a structure, the switches $SWP_1$-$SWP_n$ and the switches $SWN_1$-$SWN_n$ control a number of connections between the current cells $C_1$-$C_n$ and the positive output terminal OUTP' and the negative output terminal OUTN' according to the impedance of the variable loading on the power line, to generate the total output current $IO_s$, such that the output voltage swing stays within a specific range.

In other words, when the impedance of the variable loading is high, the number of connections between current cells $C_1$-$C_n$ and positive output terminal OUTP' and negative output terminal OUTN' of the current mode line driver 206 decreases to decrease the maximum of the total output $IO_s$; when the impedance of the variable loading is low, the number of connections between current cells $C_1$-$C_n$ and positive output terminal OUTP' and negative output terminal OUTN' in the current mode line driver 206 increases to increase the maximum of the total output current $IO_s$, and thus the output voltage swing stays within a specific range. As a result, the current mode line driver 206 can maintain the output voltage swing within a specific range without severe variations due to the loading variations, and the current mode line driver 206 is an open loop structure having lower power consumption.

Specifically, when the power line system 20 intends to transmit a signal, the power line system 20 first sends a testing signal for voltage detection, e.g. detecting the output voltage swing, to determine the impedance of the variable loading of the power line, wherein since the signal transmission period is short, i.e. around millisecond level, it can be assumed that the detected impedance of the variable loading remains unchanged during signal transmission period, i.e. the connected loading of the power line is fixed during detection and during signal transmission period. Then, the AGC 208 generates a gain control signal Con to the current mode line driver 206 according to the impedance of the variable loading at this moment, such that the switches $SWP_1$-$SWP_n$ and the switches $SWN_1$-$SWN_n$ control the number of connections between the current cells $C_1$-$C_n$ and the positive output terminal OUTP' and the negative output terminal OUTN' according to the gain control signal Con, and the power line system 20 utilizes the number of the current cells for transmission. As a result, the current mode line driver 206 changes the number of connections between the current cells $C_1$-$C_n$ and the positive output terminal OUTP' and the negative output terminal OUTN' during signal transmission according to the measured impedance of the variable loading before signal transmission, to maintain the output voltage within a specific range.

Noticeably, the automatically gain control circuit 208 can be coupled to an analog-digital converter (ADC) of a detecting loop of the power line system 20, to control the switches $SWP_1$-$SWP_n$ and the switches $SWN_1$-$SWN_n$ via digital signals; otherwise, the automatically gain control circuit 208 can be coupled to the positive output terminal OUTP' and the negative output terminal OUTN', and controls the switches $SWP_1$-$SWP_n$ and the switches $SWN_1$-$SWN_n$ via analog signals after directly performing detection. Realizations of the automatically gain control circuit 208 are not limited to these.

In addition, each of the current cell of the current cells $C_1$-$C_n$ comprises at least one cascaded N-type metal oxide semiconductor (MOS) transistor or P-type MOS transistor. In such a condition, during a signal transmission period of the power line system 20, the number of connections between the current cells $C_1$-$C_n$ of the current mode line driver 206 and the positive output terminal OUTP' and the negative output terminal OUTN' is fixed. The DAC 202 converts the digital signal into an analog-formed output signal bias $V_g$, and then sends the output signal bias $V_g$ to current cells the current cells $C_1$-$C_n$ connected to the positive output terminal OUTP' and the negative output terminal OUTN'. Thus, a gate of one of the at least one cascaded N-type MOS transistor or P-type MOS transistor can receive the output signal bias $V_g$ to control the output current. As a result, after the current mode line driver 206 fixes the number of connections between the current cells $C_1$-$C_n$ and the positive output terminal OUTP' and the negative output terminal OUTN' during signals transmission, the DAC 202 can adjust magnitudes of a portion of the output current $IO_1$-$IO_n$ for generating the total output current $IO_s$ via the output signal bias $V_g$, to generate proper differential signals.

Figure 1A:
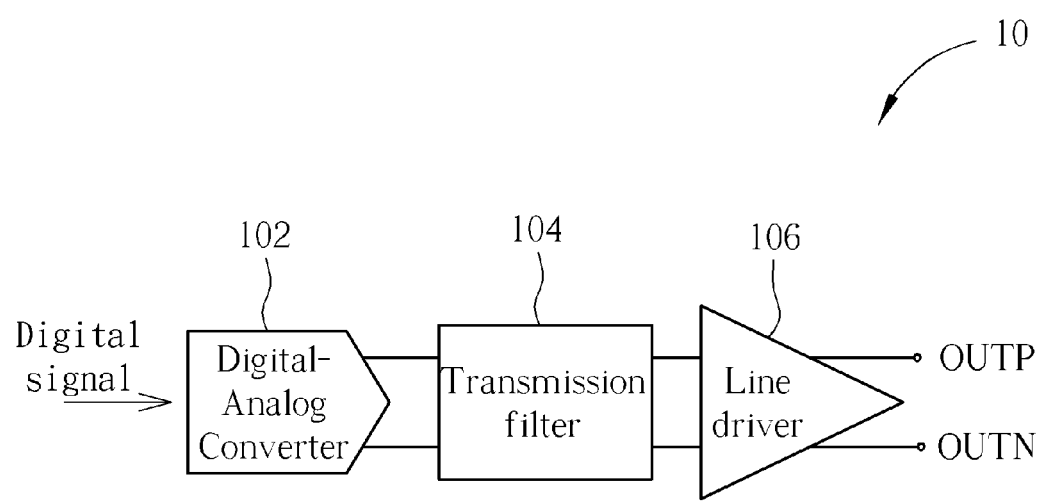
FIG. 1A is a schematic diagram of a conventional power line system.
Figure 1B:
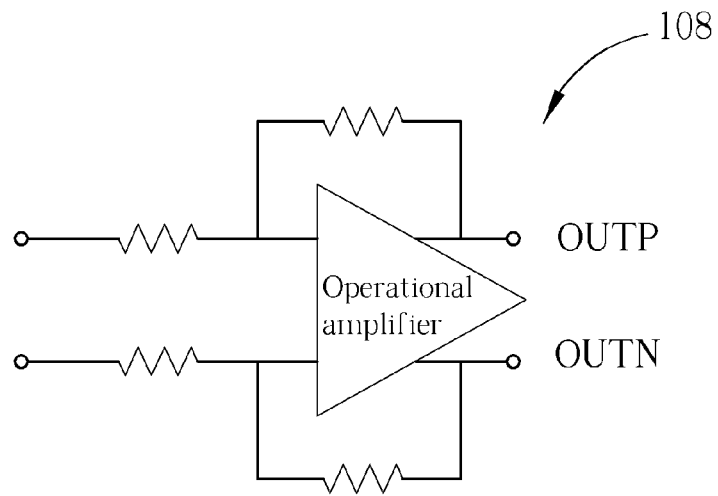
FIG. 1B and FIG. 1C are schematic diagrams of two voltage mode line drivers for realizing the line driver 106 in FIG. 1A, respectively.
Figure 1C:
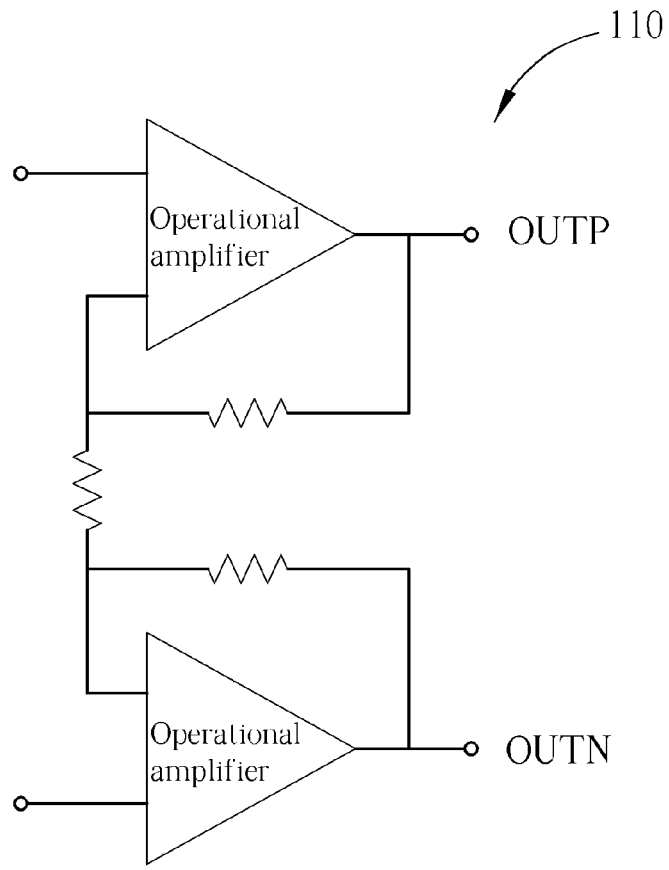
Figure 1D:
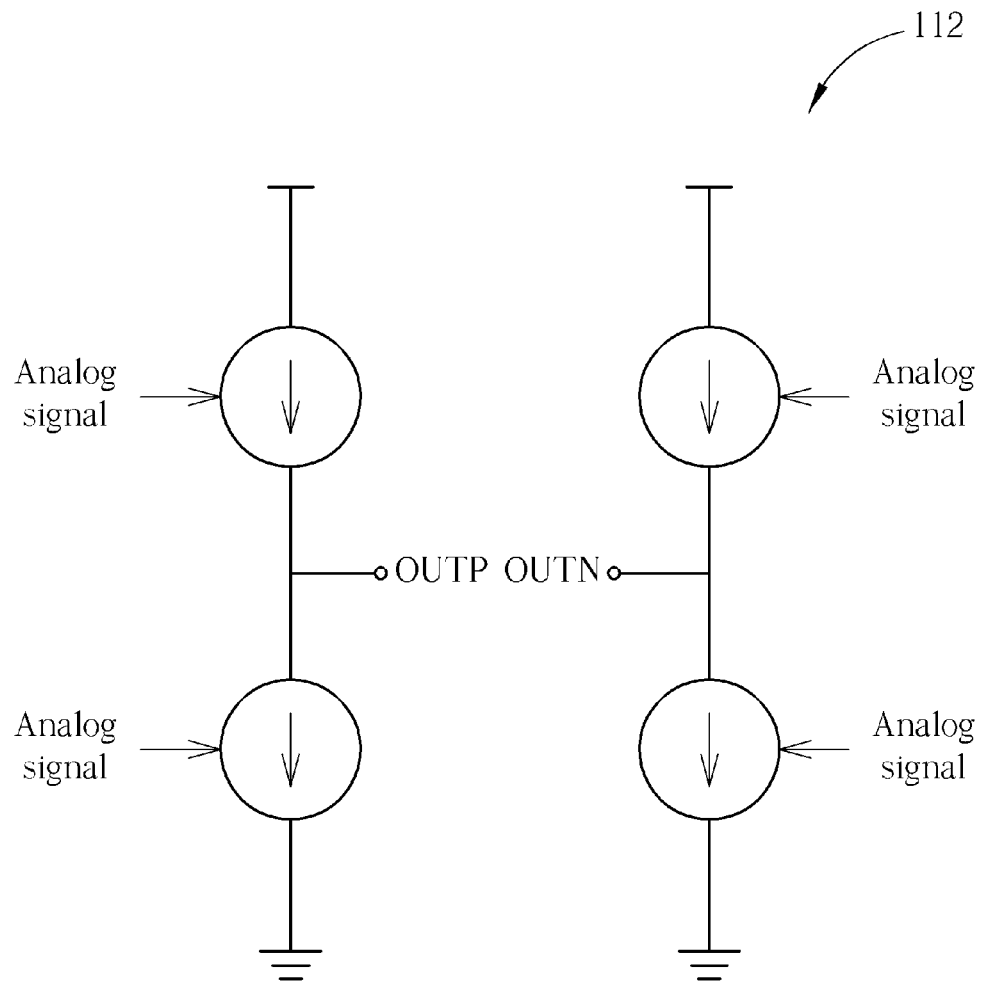
FIG. 1D is a schematic diagram of a current mode line driver for realizing the line driver 106 in FIG. 1A.

On the other hand, the power line system 20 can further comprise a voltage mode line driver 210, which is coupled to the positive output terminal OUTP' and the negative output terminal OUTN', and has a closed loop structure. Realizations of the voltage mode line driver 210 can be referred to the voltage mode line drivers 108 and 110 shown in FIG. 1B and FIG. 1C, wherein the voltage mode line driver 210 preferably has lower driving power than each current cell of the current cells $C_1$-$C_n$. In other words, the power line system 20 mainly performs driving via the current mode line driver 206 to utilize its open loop structure and has low power consumption, while performing driving with the voltage mode line driver 210 with lower driving power, i.e. having low power consumption, so as to achieve finely adjustment functions by utilizing a closed loop structure of the voltage mode line driver 210 for feedback and thus have better linearity.

Moreover, as shown in FIG. 2A, the power line system 20 can further comprise a pre-distortion unit 212, coupled to the DAC 202 to compensate the linearity of the current cells $C_1$-$C_n$. In short, it is usual that the higher power, the worse linearity. At this moment, the pre-distortion unit 212 can perform pre-distortion on the original digital signals, and then send the pre-distorted digital signals to the DAC 202 to perform compensation, such that the DAC 202 can generate proper analog signals. For example, if the power line system 20 detects an output signal of a larger power has power lower than expected before signal transmission, the pre-distortion unit 212 increases power of the portion of the digital signals of larger power to perform compensation during pre-distortion. As a result, the pre-distortion unit 212 can pre-distort the original digital signals, and then output the pre-distorted digital signals to the DAC 202 such that the DAC 202 can generate the analog signals, e.g. the output signal bias $V_g$ etc., from the pre-distorted digital signals to compensate the linearity of the current cells $C_1$-$C_n$.

Noticeably, the main spirit of the present invention is that the current mode line driver 206 comprises a plurality of the current cells $C_1$-$C_n$, and the current mode line driver 206 can adjust the number of the current cells $C_1$-$C_n$ for summing and generating the total output current $IO_s$ according to the impedance of the variable loadings. Therefore, the output voltage swing of the current mode line driver 206 stays within a specific range. Those skilled in the art should make modifications or alterations accordingly. For example, the above embodiment is illustrated by a power line system. But, the present invention can be applied to any communication systems with variable loadings in practice. Besides, the above voltage mode line driver 210 and the pre-distortion unit 212 both are used for increasing linearity, wherein the voltage mode line driver 210 and the pre-distortion unit 212 can be implemented simultaneously or separately while retaining respective merits, and is not limited to any implementation. Furthermore, the each current cell coupled to the positive output terminal OUTP' and the negative output terminal OUTN' in FIG. 2A is realized by two cascaded MOS transistors (not limited to N-type or P-type), to increase linearity, respectively. The current cell can also be realized by one MOS transistor in practice, and is not limited to MOS transistor, as long as it can be controlled by the analog control signals generated by the DAC 202, e.g. the output signal bias $V_g$ etc.

In the prior art, the voltage mode line driver needs higher power consumption to maintain linearity during high frequency transmission, while the current mode line driver only has one current cell, thus the output voltage swing has severe variations due to loading variations when applying on the power line with variable loadings, so the output voltage swing may be out of the ideal operating range. In comparison, the present invention of the current mode line driver 206 comprises a plurality of the current cells $C_1$-$C_n$, and the current mode line driver 206 adjusts the number of the current cells $C_1$-$C_n$ for summing and generating the total output current $IO_s$ according to the impedance of the variable loadings, so as to maintain the output voltage swing within a specific range and have lower power consumption because of the open loop structure. Furthermore, the present invention further provides the voltage mode line driver 210 with smaller driving power, i.e. having low power consumption, to utilize a closed loop structure for feedback, so as to have better linearity, and also provides the pre-distortion unit 212 for compensating the linearity of the current cells $C_1$-$C_n$.

To sum up, the power line system of the present invention has low power consumption and good linearity, having especially benefit for high frequency transmission application.

Those skilled in the art will readily observe that numerous modifications and alterations of the device and method may be made while retaining the teachings of the invention.

What is claimed is:

1. A current mode transmission line driver for a communication system with a variable loading, the current mode transmission line driver comprising:
    a positive output terminal;
    a negative output terminal;
    a plurality of current cells, for generating a plurality of output currents; and
    a plurality of switches, coupled between the plurality of current cells and the positive output terminal and the negative output terminal, respectively, for controlling a number of connections between the plurality of current cells and the positive output terminal and the negative output terminal according to impedance of the variable loading, to sum and generate a total output current such that an output voltage swing stay within a specific range.

2. The current mode line driver of claim 1, wherein the communication system further comprises an automatic gain control (AGC) circuit, for generating a gain control signal according to the impedance of the variable loading, and the plurality of switches control the number of connections between the plurality of current cells and the positive/negative output terminals according to the gain control signal.

3. The current mode line driver of claim 1, wherein each of the plurality of current cells comprises at least one cascaded N-type metal oxide semiconductor (MOS) transistor or P-type MOS transistor.

4. The current mode line driver of claim 3, wherein a gate of the at least one cascaded N-type MOS transistor or P-type MOS transistor a current cell of the plurality of current cells connected to the positive output terminal and the negative output terminal receives an output signal bias to control the output current.

5. The current mode line driver of claim 1, wherein the communication system further comprises a voltage mode line driver, coupled to the positive output terminal and the negative output terminal, having a closed loop structure.

6. The current mode line driver of claim 1, wherein the communication system further comprises a pre-distortion cell, for compensating linearity of the plurality of current cells.

7. The current mode line driver of claim 1, wherein the communication system is a power line communication system.

* * * * *

UNITED STATES PATENT AND TRADEMARK OFFICE
CERTIFICATE OF CORRECTION

| | | |
|---|---|---|
| PATENT NO. | : 8,508,261 B2 | Page 1 of 1 |
| APPLICATION NO. | : 13/156351 | |
| DATED | : August 13, 2013 | |
| INVENTOR(S) | : Hsin-Hsien Li | |

It is certified that error appears in the above-identified patent and that said Letters Patent is hereby corrected as shown below:

On the title page, item (73), correct the name of the assignees from "Ralink Techonology Corp." to --Ralink Technology Corp.--.

Signed and Sealed this
Twenty-second Day of October, 2013

Teresa Stanek Rea
*Deputy Director of the United States Patent and Trademark Office*